(12) United States Patent
Monereau

(10) Patent No.: US 6,238,458 B1
(45) Date of Patent: May 29, 2001

(54) PROCESS FOR TREATMENT OF A GASEOUS MIXTURE BY PRESSURE SWING ADSORPTION, WITH VARIABLE PRODUCTION FLOW RATE

(75) Inventor: Christian Monereau, Paris (FR)

(73) Assignee: L'Air Liquide Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/405,023

(22) Filed: Sep. 27, 1999

(30) Foreign Application Priority Data

Sep. 25, 1998 (FR) .................................................. 98 12020

(51) Int. Cl.$^7$ .................................................. B01D 53/053
(52) U.S. Cl. .................................. 95/19; 95/22; 95/101; 95/102; 95/105; 95/130
(58) Field of Search .................. 95/8, 11, 12, 19, 95/22, 96–98, 100–105, 130

(56) References Cited

U.S. PATENT DOCUMENTS

| | | | |
|---|---|---|---|
| 4,234,322 | * 11/1980 | DeMeyer et al. | 95/19 |
| 4,299,595 | * 11/1981 | Benkmann et al. | 95/19 X |
| 4,693,730 | * 9/1987 | Miller et al. | 95/8 |
| 4,761,165 | * 8/1988 | Stöker et al. | 95/98 X |
| 5,108,467 | * 4/1992 | Schroter et al. | 95/103 |
| 5,174,796 | * 12/1992 | Davis et al. | 95/100 |
| 5,258,056 | * 11/1993 | Shirley et al. | 95/22 |
| 5,294,247 | * 3/1994 | Scharpf et al. | 95/102 X |
| 5,529,607 | 6/1996 | Tan | 95/12 |
| 5,733,359 | * 3/1998 | Doong et al. | 995/8 |
| 5,876,485 | * 3/1999 | Andreani | 95/105 X |
| 5,906,672 | * 5/1999 | Michaels et al. | 95/12 |
| 5,917,135 | * 6/1999 | Michaels et al. | 95/12 X |
| 6,090,185 | * 7/2000 | Monereau et al. | 95/105 X |

FOREIGN PATENT DOCUMENTS

| | | |
|---|---|---|
| 296 05 889 | 8/1996 | (DE) . |
| 0 819 463 | 1/1998 | (EP) . |
| 0 821 992 | 2/1998 | (EP) . |

* cited by examiner

*Primary Examiner*—Robert H. Spitzer
(74) *Attorney, Agent, or Firm*—Young & Thompson

(57) ABSTRACT

Upon a reduction of the production flow rate, there is added to the cycle, at an extreme pressure PM and/or Pm of the cycle substantially different from atmospheric pressure, an idle time in the course of which the adsorber (1A, 1B) is isolated. The process is used in trans-atmospheric cycles for the production of oxygen from atmospheric air.

15 Claims, 3 Drawing Sheets

PROCESS FOR TREATMENT OF A GASEOUS MIXTURE BY PRESSURE SWING ADSORPTION, WITH VARIABLE PRODUCTION FLOW RATE

FIELD OF THE INVENTION

The present invention relates to a process for treatment of a gaseous mixture by Pressure Swing Adsorption or PSA, of the type in which there is used at least one adsorber and in which, in each adsorber, there is carried out, for a predetermined nominal production, a cycle comprising the following successive phases:

- a production phase by co-current admission of mixture into the adsorber and recovery of a fraction enriched in the least adsorbable compounds, for supply to a production gas conduit, in the course of which phase the maximum pressure PM of the cycle is reached;
- a regeneration phase comprising at least one step of depressurization and in the course of which the minimum pressure Pm of the cycle is reached;
- a repressurization phase of the adsorber to the initial pressure of the production phase; and
- at least one of the extreme pressures PM and Pm of the cycle being substantially different from atmospheric pressure.

The invention is applicable particularly to trans-atmospheric cycles for the production of impure oxygen, having typically a purity of the order of 90 to 95%, from atmospheric air. This production of gas will be called "oxygen" in what follows.

The pressures in question here are absolute pressures.

BACKGROUND OF THE INVENTION

The mentioned adsorption cycles are used in PSA installations which comprise a large number of valves having a high frequency of opening/closing.

Given that the good operation of the cycle depends on the sequences of opening and closing these valves, which permit obtaining the foreseen pressure cycle, it will be easily seen that the malfunction of one of these valves which are manipulated at each cycle, can cause serious problems in the operation of a PSA installation.

By way of example, there can be distinguished in particular two cases of malfunction relating to these valves:

1) A first malfunction can consist of mechanical blockage of the valve, resulting in that either the valve remains closed despite receiving an opening signal (or conversely), or it opens or closes only very slowly.

Such incidence can be detected by end of path detector installed at the level of the veins and if desired connected to timers.

Moreover, given that this type of malfunction generally causes substantial unbalance in the pressure cycle of the various adsorbers, such an incident is relatively easy to identify.

2) A second malfunction can result from a defect of sealing of a closed valve, which leads to internal loss either between adsorbers or between one adsorber and the production line or the residual line.

In contrast to mechanical blockage, unsealed closed valve losses are difficult to detect in an operating unit.

They nevertheless translate to decreased performance of the PSA installation due either to unbalanced operation of the adsorbers, or directly a production loss in the residual gas line.

To detect valves having in their closed position a sealing fault, there are conventionally used periodic stoppages of the operation of the installation to carry out tests of sealing.

But these controls have the drawback that they are long and intricate. Moreover, given the duration of stoppage of the installation, these controls can only be carried out at spaced time intervals.

However, given that the loss of production caused by a sealing defect of a valve and translating into a loss of several percent of the extraction output can last several months, the loss can be very great.

SUMMARY OF THE INVENTION

The invention has for its object providing a PSA process, typically of trans-atmospheric type, permitting economical adaptation to a variable production flow rate, as well as easy detection of the sealing of the valves.

To this end, the invention has for its object a process of the mentioned type, characterized in that, upon a reduction of production flow rate, there is added to the cycle, substantially at an extreme pressure PM and/or Pm of the cycle, at least one idle time in the course of which the adsorber is isolated.

The process according to the invention can comprise one or several of the following characteristics, taken alone or in all possible combinations:

- upon reduction of flow rate, there is added an idle time substantially at the maximum pressure PM of the cycle, typically immediately following the production phase;
- upon a flow rate reduction, there is added an idle time substantially at the minimum pressure Pm of the cycle, typically immediately before the repressurization phase;
- the pressure of the adsorber during at least an idle time for at least certain cycles, is monitored;
- in a process using two adsorbers, there is provided a step of partial balancing between the two absorbers from their respective extreme pressures and, typically upon said reduction of production flow rate, there is added to the cycle two concomitant idle times having the same duration.

BRIEF DESCRIPTION OF THE DRAWINGS

An example of operation of the invention will now be described with respect to the accompanying drawings, in which.

DETAILED DESCRIPTION OF THE INVENTION

The installation shown by way of example in FIG. is particularly adapted for the production of oxygen, particularly so-called impure oxygen (called "oxygen" for purposes of simplicity), with a content preferably comprised between about 90 and 95%, from atmospheric air.

In the illustrated example, the installation comprises essentially two adsorbers 1A and 1B, a compressor or blower 2, a vacuum pump 3 and an assembly of conduits and valves, as well as control and regulation means (not shown), adapted to use the cycle described hereafter. The compressor and pump are volumetric machines of the "Roots" type and turn continuously at constant speed.

Figure 1:
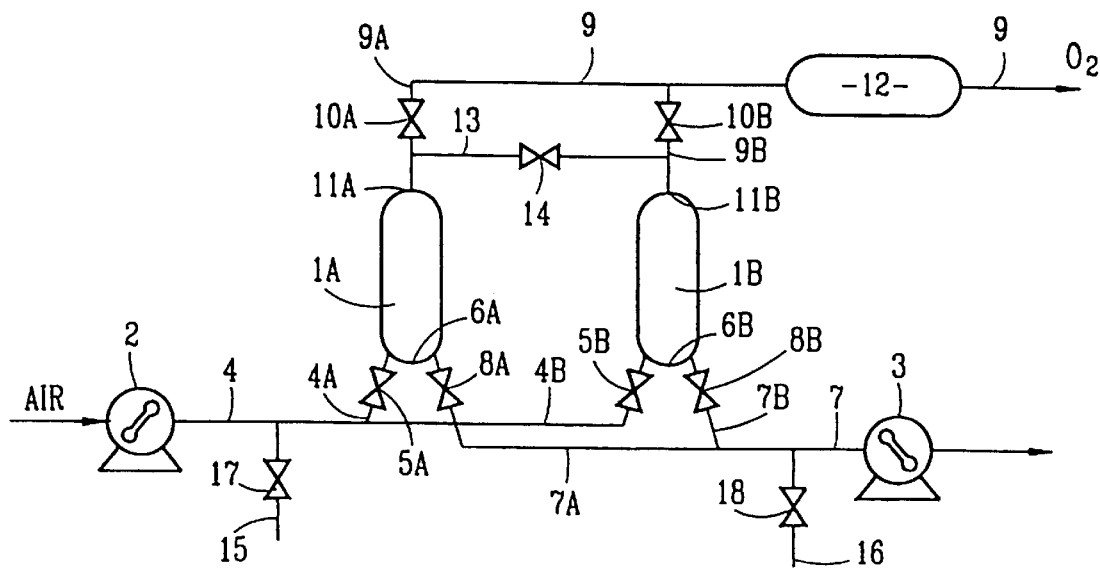
FIG. 1 shows schematically a PSA installation to which the invention is applied.

There are schematically shown in FIG. 1:
- a supply conduit 4 for atmospheric air, which leaves the exhaust of compressor 2 and which divides into two branches 4A, 4B provided with respective supply valves 5A, 5B and connected respectively to the lower input 6A, 6B of the adsorbers;
- a purge/elution conduit 7 which divides into two branches 7A, 7B provided with purge/elution valves 8A, 8B and extending respectively from the inputs 6A, 6B of the adsorbers;
- a production conduit 9 which is divided into two branches 9A, 9B provided with production valves 10A, 10B and respectively leaving the upper outputs 11A, 11B of the adsorbers. A surge tank 12 is mounted in the conduit 9; and
- a balancing/elution conduit 13 which directly connects between them the outputs 11A and 11B and which is provided with a balancing/elution valve 14.

The intake of the compressor 2 and the output of the vacuum pump 3 are in permanent communication with the surrounding atmosphere. The adsorbers 1A and 1B each contain at least one bed of adsorbent adapted to adsorb selectively nitrogen from the air, which is in this example a molecular sieve of the type CaA or a zeolite exchanged with lithium. Moreover, bypasses 15 and 16, provided with respect to valves 17, 18, are respectively connected to the conduits 4 and 7, just downstream of the compressor 2 and just upstream of the pump 3. These bypasses open into the surrounding atmosphere.

Figure 2:
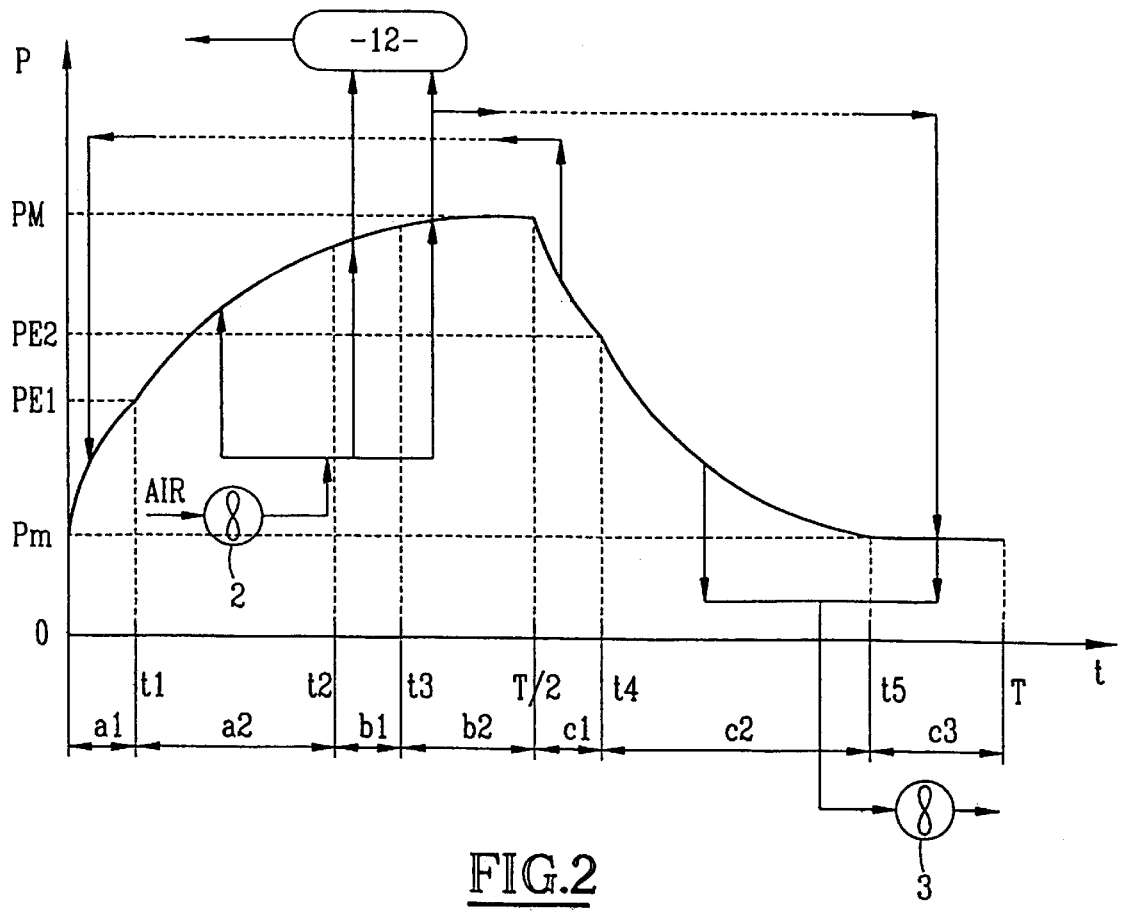
FIG. 2 shows a preferred cycle used in this installation for the nominal production flow rate.

By means of the installation thus described, there is used for example the preferred trans-atmospheric PSA cycle shown in FIG. 2 for nominal flow rate of oxygen product.

In this FIG. 2, in which the time t is on the abscissa and the absolute pressures P on the ordinates, the curve shown by the arrows indicate, in conventional manner, the movements and destinations of the gaseous flows.

In the example in question, the high pressure PM of the cycle is substantially greater than atmospheric pressure and is selected to be 1.40 bar, whilst the low pressure Pm of the cycle is substantially lower than the atmospheric pressure and is selected to be equal to 0.4 bar.

The cycle will be described below for one adsorber, namely the adsorber 1A, and for the nominal flow rate for oxygen production. The other adsorber 1B follows an identical cycle but offset timewise by a half-period T/2.

The illustrated cycle is constituted by the following sequential steps:

(a) Recompression Phase:
(a1) From t=0 to t1, a first step of countercurrent recompression with partial balancing of pressures with the other adsorber in the course of step (c1) of first co-current decompression described later. At the time t1, the pressure has returned to an intermediate value PE1.
(a2) From t1 to t2, a step of final co-current recompression by means of air from the compressor. At time t2, the pressure is generally around that or a bit higher than that of the value of the pressure in the capacity 12.

(b) Production Phase:
(b1) From t2 to t3, a first co-current adsorption step, in which air to be treated is introduced via the conduit 4 at the intake of the adsorber and flows co-current through the latter. The production oxygen is withdrawn at the adsorber outlet and sent to the production column 9.
(b2) From t3 to T/2, a second co-current adsorption step, which differs from the preceding only in that a fraction of the oxygen product is removed at the output of the adsorber and is sent co-current into the other adsorber in the purge/elution phase (c3) described hereafter. The pressure PM is generally reached at the end of this step.

(c) Adsorbent Regeneration Phase:
(c1) From T/2 to t4, a step of first co-current decompression with partial balancing of pressures with the other adsorber in a first co-current recompression step (a1) described hereinafter, via its production outlet. In the course of this stage, the pressure of the adsorber falls from PM to an intermediate value PE2>PE1 (or in modification, PE2=PE1).
(c2) From t4 to t5, a step of co-current purge with the imposition of vacuum. In the course of this step, the inlet of the adsorber is connected to the vacuum pump, which brings the pressure substantially to the low pressure Pm of the cycle and which discharges the breathed gas into the atmosphere.
(c3) From t5 to T, a purge/elution phase to about the low pressure Pm. In the course of this step, the inlet of the adsorber is again connected to the vacuum pump, and, simultaneously, its outlet is connected to that of the other adsorber, which is in the second adsorption step (b2).

Figure 3:
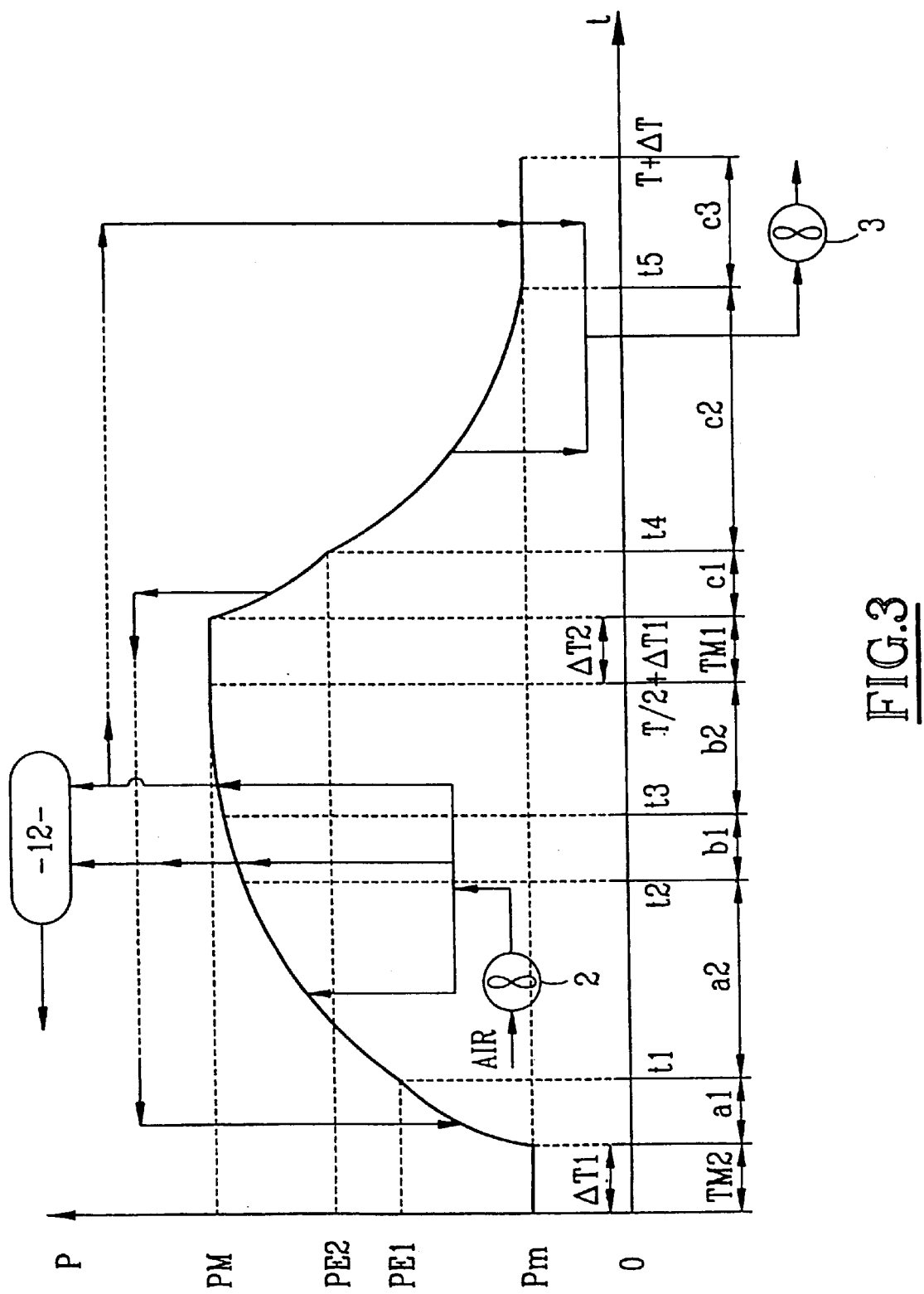
FIG. 3 shows the cycle used for reduced production flow rate.

FIG. 3 shows a modification of the cycle of FIG. for a reduced production flow rate. In the illustrated example, this modification consists solely in a prolongation of the duration T of the cycle by the introduction of two idle times, designated TM1 and TM2, 1 (TM1) immediately following the last adsorption step (b2), and the other (TM2) immediately before the first repressurization step (a1). In the course of each idle time, the adsorber is isolated, which is to say that all the valves connected to its inlet and outlet are closed, and the corresponding machine, namely the compressor 2 for TM1 and the pump 3 for TM2, is operated empty via its bypass 15 or 16.

Thus, the idle time TM1 is provided when the adsorber is at the high pressure PM, whilst the idle time TM2 is provided when the adsorber is at the low pressure Pm. Moreover, if $\Delta T1$ and $\Delta T2$ designate the durations of the two idle times, the cycle is prolonged by a total duration $\Delta T=\Delta T1+\Delta T2$.

It will be noted that in the case of the described example, because of the offset of phase between the adsorbers by a half-time of the cycle, the two idle times are concomitant, which is to say simultaneous and of equal duration. While the adsorber 1A is in idle time TM1, the adsorber 1B is in idle time TM2, and vice versa.

This modification of the cycle has the result of decreasing the overall production flow rate by decreasing the number of cycles per hour, without modifying the production of each cycle. Thus, if DN is the nominal oxygen product flow rate, the reduced flow rate DR is such that:

$$DR(T+\Delta T)=DN \times T \qquad (1)$$

This formula permits automatically computing the duration $\Delta T$ as a function of the required reduced flow rate:

$$\Delta T=T \times (DN-DR)/DN \qquad (2)$$

The duration $\Delta T$ (which can vary in the course of time with variations of the required oxygen flow rate) can be immediately put to use, which is to say by acting on the cycle in the course of or following, or after a certain delay following, the measurement of the flow rate DR, so as to verify that it is not a simple fluctuation of consumed oxygen flow rate.

If the purity of the oxygen product must remain within narrow limits, the process, in a variation, can be modified as follows: the purity of the oxygen product is measured, and, if a modification is needed, for example a decrease, in excess of this purity in the reduced operation described below, the value of ΔT obtained by the formula (2) is corrected in the direction which re-establishes the nominal purity, which is to say that ΔT is reduced.

In practice, this correction constitutes only a small fraction of ΔT. For example, upon a reduction of the flow rate of 20%, formula (2) gives ΔT=0.2T, namely, for a cycle of 2×50 seconds, ΔT=2×10 seconds. If there is considered a change of purity from 90% to 89%, a modification of ΔT for 2×9 seconds permits re-establishing the purity practically at 90%.

This correction could easily take place in an automatic way.

Moreover, in the course of at least certain cycles, for example at predetermined time intervals, the pressure of the adsorbers and of the surge tank is continuously measured during the idle times. If this pressure varies, which is to say decreases for the idle time TM1 and/or increases for the idle time TM2, it is indicated that one of the corresponding veins leaks.

For example, if the adsorber 1A is at the low pressure Pm and its pressure rises during idle time TM2, whilst the pressure of adsorber 1B remains stable and that of the surge tank varies normally, it is indicated that the air valve 4A or vacuum valve 8A of the adsorber 1A leaks.

The control of the variation of pressure in the adsorbers can be carried out automatically, and an alarm can be given if this variation is greater than an initially fixed value.

It is to be noted that thanks to the fact that the control of pressures carried out at times in the cycle when the pressures in the adsorbers are the farthest on the one hand from atmospheric pressure, and from each other on the other hand, the precision of this control is a maximum.

The provision of an idle time, in reduced operation, immediately after the production phase, has another important advantage.

Thus, the surge tank 12 operates between a high pressure PHC adjacent the high pressure PM of the cycle and the minimum low pressure PBC at which gas is to be supplied to the user. Computation shows that in an operation reduced by 50%, the necessary volume of the surge tank is greater than 40% of the volume necessary for nominal operation, the increase reaching 60% for operation reduced to 25%.

If it is not desired to increase the volume of the surge tank by such an amount, it is then necessary substantially to increase the high pressure of the cycle, which is detrimental to energy consumption.

In a modification of the process described above, the adsorber is left in communication with the surge tank, via the valve 10A or 10B, for at least a portion of the idle time TM1.

The product gas is then extracted simultaneously from the surge tank 12 and from the adsorber. The volume of the storage capacity is thus artificially increased, and the pressure drop during this phase can be substantially reduced.

The increase in the high pressure of the cycle necessary to be able to use the nominal storage capacity is thus very substantially reduced.

Of course, the process according to the invention is compatible with various modifications of the cycle of FIG. 2 which have been proposed the better to adapt it to economical conditions, to the purity of the oxygen product, to the nature of the adsorbents, etc. These modifications are in particular:

the simultaneous co-current recompression by air pending at least a portion of step (a1);

the simultaneous co-current recompression with oxygen for at least a portion of step (a2);

a simultaneous co-current depressurization during at least a portion of step (c1).

Figure 4:
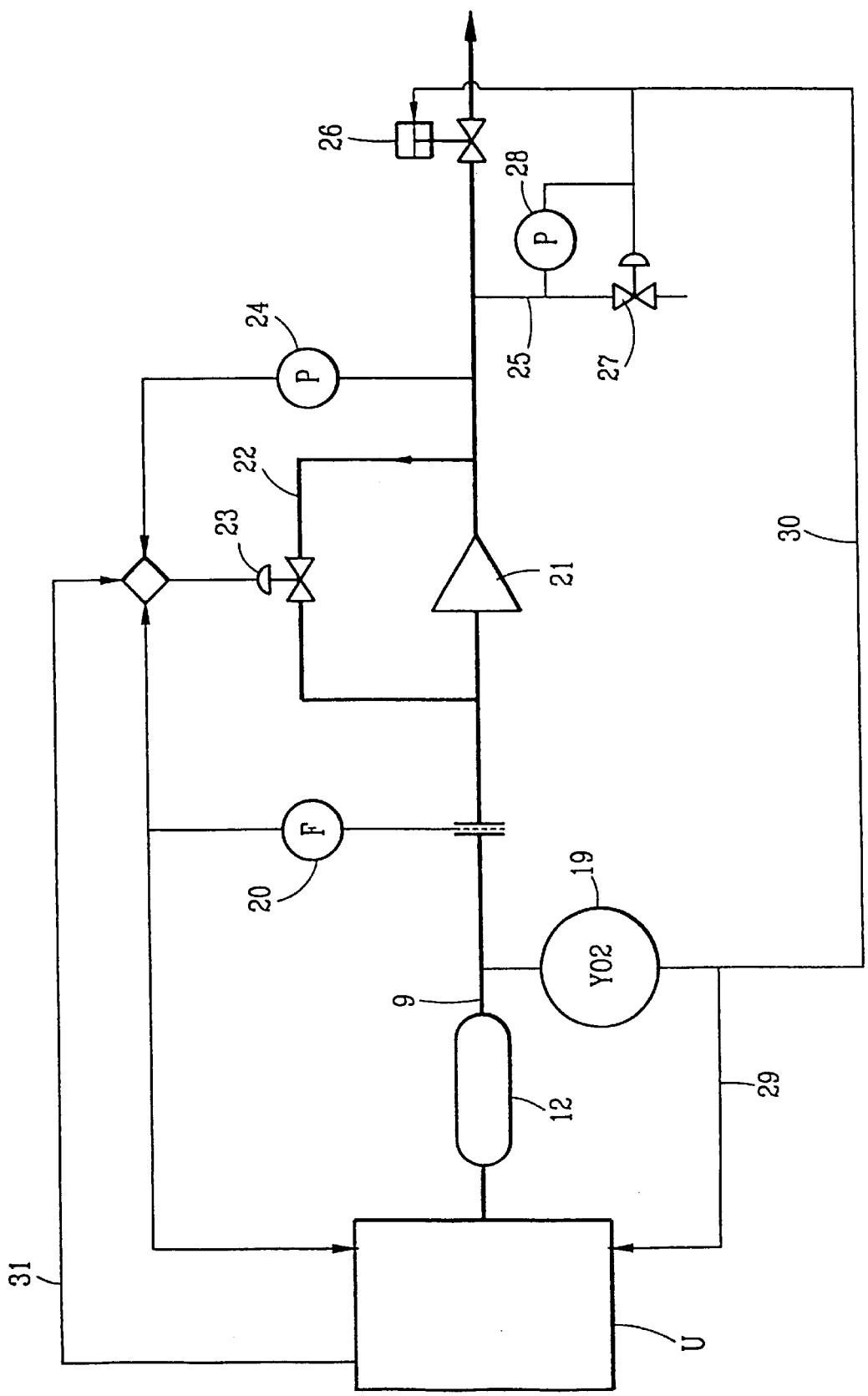
FIG. 4 shows the regulation of the oxygen flow rate supplied to the user.

FIG. 4 shows schematically an example of equipment of the conduit 9, for the regulation of the oxygen delivered to the user, in this case in which we are working with a correction of the calculated value of ΔT as explained above.

In FIG. 4, there is designated the assembly of the PSA unit by U. The conduit 9 is provided, from the output of the surge tank 12, with an oxygen content analyzer 19; a flow meter 20; a constant flow rate oxygen compressor 21 provided with a recycle bypass 22 itself controlled by a valve 23; a manometer 24; an air outlet 25; and a cutoff valve 26.

The outlet 25 is controlled by a valve 27 associated with a manometer 28.

The outlet of the analyzer 19 is connected via a line 29 to the control computer of the unit U, to carry out the mentioned correction of Δ, and via a line 30 to the valves 26 and 27. The outlet of the flowmeter 20 is connected to said computer and to the valve 23, and that of the manometer 24 to this latter.

The adjustment of the oxygen flow rate is obtained by means of the valve 23, which recycles a variable flow rate to the intake of the compressor. This adjustment is carried out principally from the pressure detected at 24.

The flow meter 20 serves on the one hand to supply an indication of the flow rate which permits modifying the duration of the cycle via the formula (2) above, and on the other hand to limit the flow rate consumed by the user in the case of overconsumption.

Moreover, so as to improve the stability of the production sent to the consumer, the valve 23 also receives orders for modification of its position in an open loop, via a line 31, from the computer of the unit U. Thus, opening the valve 23 is increased during steps (b1) and (b2) described above. In this way, the manometer 24 controls only the variations of opening relative to the theoretical values. This open loop permits anticipating developments of pressure due to the course of the cycle.

The valve 27 is open and the valve 26 closed upon starting the unit U, until the desired oxygen purity is obtained. The valve 27 also is open when the pressure detected at 28 exceeds a predetermined high threshold.

Generally speaking, the connections between the instruments (pressure detector, flow meter . . . ) and the equipment (valves 23, 26, . . . ) can be direct or pass through the computer of the unit U or by a dedicated computer.

What is claimed is:

1. Process for treating a gaseous mixture by pressure swing adsorption (PSA), in which there is used at least one adsorber and in which there is carried out, in each adsorber, for a predetermined nominal production, a cycle comprising the following successive steps:

a production phase by co-current admission of the gaseous mixture into the adsorber and recovery of a fraction enriched in least adsorbable components to supply to a production gas conduit, in the course of said production phase a maximum pressure PM of the cycle is reached;

a regeneration phase comprising at least one depressurization step and in the course of which a minimum pressure Pm of the cycle is reached; and a repressurization phase of the adsorber to an initial pressure of the production phase; at least one of the maximum and minimum pressures of the cycle being substantially different from atmospheric pressure;

wherein upon a reduction of production flow rate, there is added to the cycle, substantially at at least one of the maximum and minimum pressures of the cycle, at least one idle time in the course of which the adsorber is isolated.

2. The process according to claim 1, wherein upon said flow rate reduction, the idle time is added substantially at the maximum pressure PM of the cycle.

3. The process according to claim 2, wherein upon said flow rate reduction, the idle time is added immediately following the production phase.

4. The process according to claim 3, wherein said enriched fraction is sent to a production surge tank, and the adsorber is left in connection with said surge tank during at least a portion of said idle time.

5. The process according to claim 1, wherein upon said flow rate reduction, the idle time is added substantially at the minimum pressure Pm of the cycle.

6. The process according to claim 5, wherein upon said flow rate reduction, the idle time is added immediately before the repressurization phase.

7. The process according to claim 1, wherein said at least one idle time comprises at least two idle times, and upon said flow rate reduction, a first of said idle times is added substantially at the maximum pressure PM, and a second of said idle times is added substantially at the minimum pressure Pm of the cycle; the pressure of the adsorber being checked for at least one of said idle times of at least certain cycles.

8. The process according to claim 7, where said enriched fraction is sent to a production surge tank, and the pressure of the surge tank is checked at the same time as the pressure of the adsorber.

9. The process according to claim 1, wherein said at least one adsorber comprises two adsorbers, and said at least one idle time comprises two concomitant idle times having the same duration, and upon said flow rate reduction, the two concomitant idle times are added to the cycle.

10. The process according to claim 9, further comprising a partial balancing step between the two adsorbers from their respective maximum and minimum pressures.

11. The process according to claim 1, wherein a total duration $\Delta T$ is computed for said at least one idle time by the formula:

$$\Delta T = T(DN-DR)/DR$$

in which T is the nominal duration of the cycle, DN the nominal production flow rate, and DR the reduced production flow rate.

12. The process according to claim 11, wherein the purity of said enriched fraction is measured for the reduced production flow rate, and in the case of excessive variation relative to the nominal purity, said total duration $\Delta T$ is corrected in a direction which tends to cancel said variation.

13. The process according to claim 1, wherein the maximum pressure PM of the cycle is comprised between 1.2 and 3 bar, and the minimum pressure Pm of the cycle is comprised within the range 0.20 and 0.65 bar.

14. The process according to claim 13, wherein the maximum pressure PM of the cycle is comprised between 1.35 and 1.85 bar, and the minimum pressure Pm of the cycle is comprised within the range 0.3 to 0.50 bar.

15. The process according to claim 1, wherein the gaseous mixture is air and the production fraction is oxygen.

* * * * *